United States Patent Office 3,457,318
Patented July 22, 1969

3,457,318
ALKENYL ADAMANTANES
Eugene C. Capaldi, Broomall, Pa., and Alfred E. Borchert, Cherry Hill, N.J., assignors to Atlantic Richfield Company, Philadelphia, Pa., a corporation of Pennsylvania
No Drawing. Filed Nov. 30, 1967, Ser. No. 686,840
Int. Cl. C07c 3/62, 3/56, 3/50
U.S. Cl. 260—666          10 Claims

ABSTRACT OF THE DISCLOSURE

Novel compositions of matter comprising polymers of alkenyl adamantanes and alkenyl adamantanes useful as intermediates in the preparation of said polymers. The polymers are useful for the manufacture of molded articles such as electrical appliance housings, transformer insulation, coatings and the like.

A process for the preparation of alkenyl adamantanes comprising contacting an adamantyl halide in the presence of a catalyst with a material selected from the group consisting of substituted allyl halides and olefins in order to produce a material selected from the group consisting of adamantyl dihaloalkanes and adamantyl haloalkanes respectively; subjecting said adamantyl dihaloalkanes to dehalogenation, and subjecting said adamantyl haloalkanes to dehydrohalogenation thereby producing said alkenyl adamantanes.

Background of invention

This invention relates to novel compositions of matter characterized by the formula

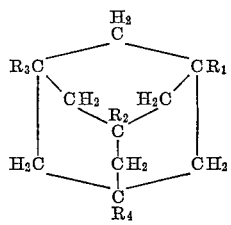

hereinafter referred to as

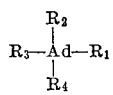

wherein Ad represents the adamantane nucleus, $R_1$ and $R_2$ attached to bridgehead carbon atoms are individually selected from the group consisting of hydrogen and alkyl groups having from 1 to 10 carbon atoms, $R_3$ attached to a bridgehead carbon atom is selected from the group consisting of hydrogen, alkyl groups having from 1 to 10 carbon atoms and alkenyl groups having from 2 to 10 carbon atoms and $R_4$ attached to the remaining bridgehead carbon atom is an alkenyl group having from 3 to 10 carbon atoms, with the proviso that the total number of carbon atoms in said alkyl groups and said alkenyl groups combined is not more than 30.

This invention also relates to the method of preparation of adamantane derivative compounds as hereinabove defined.

The carbon nucleus of adamantane contains 10 carbon atoms arranged in a completely symmetrical, strainless manner such that there are three condensed 6-member rings and four bridgehead carbon atoms. The structure of adamantane ($C_{10}H_{16}$) is commonly depicted as follows:

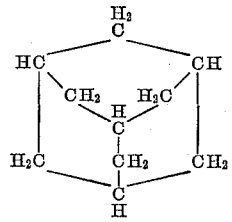

hereinafter referred to as

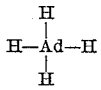

wherein Ad represents the admantane nucleus.

The molecule contains four tertiary hydrogen atoms attached respectively at the bridgehead carbon atoms. All four bridgehead carbons are equivalent to each other, and likewise, all rings are equivalent.

Summary of invention

According to our invention, we have now discovered a method for the preparation of alkenyl adamantanes having from 1 to 2 alkenyl substituents and from none to 3 alkyl substituents. We have discovered that the compounds produced in accordance with our invention can be obtained from haloadamantanes, more specifically, from haloadamantanes having from none to 3 alkyl substituents.

In the method of our invention a haloadamantane is reacted with a material selected from the group consisting of substituted allyl halides and olefins in order to produce a material selected from the group consisting of adamantyl dihaloalkanes and adamantyl haloalkanes respectively. Thereafter the adamantyl dihaloalkane is subjected to dehalogenation and the adamantyl haloalkane is subjected to dehydrohalogenation thereby producing the corresponding alkenyl adamantanes.

Representative alkenyl adamantanes that can be prepared in accordance with our invention are:

1-allyladamantane
1-allyl-3-methyladamantane
1-allyl-3,5-dimethyladamantane
1-allyl-3,5,7-trimethyladamantane
1-allyl-3-ethyladamantane
1-allyl-3-methyl-5-ethyladamantane
1-allyl-3,5,7-triethyladamantane
1-(1-pentenyl)adamantane
1-(1-hexenyl)adamantane
1-(1-hexenyl)-3-methyladamantane
1-(1-hexenyl)-3,5,7-trimethyladamantane
1-(1-octenyl)-3-propyladamantane
1-(1-octenyl)-3-hexyl-5-methyl-7-propyladamantane
1-(1-nonenyl)adamantane
1-(1-decenyl)adamantane
1-(1-decenyl)-3-decyl-5-hexyl-7-propyladamantane
1-allyl-3-vinyladamantane
1-allyl-3-butyl-5-hexyl-7-vinyladamantane
1,3-diallyladamantane
1,3-diallyl-5-butyl-7-hexyladamantane
1,3-di(1-pentenyl)-5,7-dipentyladamantane Each of the above-named compounds is formed by either the dehalogenation or dehydrohalogenation of the corresponding adamantyl dihaloalkane and adamantyl haloalkane respectively.

The alkenyl substituted compounds prepared in accordance with our invention have utility in the preparation of polymers having high thermal stability. Further, the preparation of alkenyl adamantanes having 2 alkenyl substituents permit the preparation of polymers containing cross linking, thereby resulting in a formation of polymers of great strength. Accordingly, said polymers can be used for the manufacture of molded articles such as electrical appliance housings, transformer insulation, coatings and the like.

It is therefore an object of our invention to provide novel compositions of matter.

It is another object of our invention to provide a novel method for the preparation of alkenyl adamantanes.

Other objects, advantages and features of our invention will be apparent to those skilled in the art without departing from the spirit and scope of our invention, and it should be understood that the latter is not necessarily limited to the accompanying discussion.

In one aspect our invention relates to novel compositions of matter and the polymers thereof wherein said novel compositions of matter are characterized by the formula

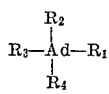

wherein Ad represents the adamantane nucleus, $R_1$ and $R_2$ are individually selected from the group consisting of hydrogen and alkyl groups having from 1 to 10 carbon atoms, $R_3$ is selected from the group consisting of hydrogen, alkyl groups having from 1 to 10 carbon atoms, and alkenyl groups having from 2 to 10 carbon atoms, and $R_4$ is an alkenyl group having from 3 to 10 carbon atoms with the proviso that the total number of carbon atoms in said alkyl groups and said alkenyl groups combined is not more than 30.

In another aspect our invention relates to a process for producing alkenyl adamantanes comprising contacting an adamantyl halide in the presence of a Friedel-Crafts type catalyst with a material selected from the group consisting of substituted allyl halides and olefins thereby producing a material selected from the group consisting of adamantyl dihaloalkanes and adamantyl haloalkanes respectively and thereafter subjecting said adamantyl dihaloalkane to dehalogenation and subjecting said adamantyl haloalkane to dehydrohalogenation.

Preferred embodiment

In accordance with the method of our invention an adamantyl halide selected from the group consisting of adamantyl bromides and adamantyl chlorides is reacted with a material selected from the group consisting of substituted allyl halides and olefins. The adamantyl halide when contacted with the substituted allyl halide results in the formation of an adamantyl dihaloalkane. The adamantyl halide when contacted with the olefin results in the formation of an adamantyl haloalkane. The adamantyl dihaloalkane is subjected to dehalogenation and the adamantyl haloalkane is subjected to dehydrohalogenation thereby forming the corresponding alkenyl adamantane.

The substituted allyl halide has the following characteristic formula

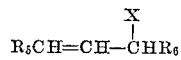

wherein X is a halogen selected from the group consisting of chlorine and bromine and $R_5$ and $R_6$ are selected from the group consisting of hydrogen and alkyl groups having from 1 to 7 carbon atoms. The olefin has the characteristic formula

wherein $R_7$ and $R_8$ are selected from the group consisting of hydrogen and alkyl groups having from 1 to 7 carbon atoms.

As can be seen by reference to a review article by H. Stetter appearing in Angew. Chemistry International Edition, volume I (1962), No. 6, pages 286–298, the methods for preparing halosubstituted adamantanes are known in the art. Methods for preparing alkyl adamantanes having from 1 to 3 alkyl substituents at bridgehead positions of the adamantane nucleus, which can be subsequently halogenated at a bridgehead position are described in the copending application of E. C. Capaldi, Ser. No. 686,838, filed concurrently herewith entitled Alkyl Adamantanes.

In the first step of the method of our invention the adamantyl halide is reacted in the presence of a catalyst and in the presence of a solvent with a material selected from the group consisting of substituted allyl halides and olefins. Particularly suitable and preferred catalysts are Friedel-Crafts type catalysts and boron trifluoride catalysts of the Friedel-Crafts type. Particular catalysts which can be used in effecting the interaction of the adamantyl halide and the olefin include metal chlorides and bromides and particularly, chlorides of aluminum, iron (III), tin (IV) and zinc. Of these catalytic materials, aluminum chloride is preferred. The conditions of operation i.e. temperature and pressure used with the various catalysts can vary, dependent upon the catalytic activity of the catalysts. Further, the catalytic materials can be used as such, or they can be composited with one another, or they can be deposited upon solid carriers or supporting materials to produce catalyst composites of desired activities. Catalyst carriers or supports include both adsorptive and substantially non-adsorptive materials including alumina, silica, activated charcoal, crushed porcelain, raw and acid-treated clays, diatomaceous earth, pumice, fire brick, etc. The carriers should be substantially inert in the sense that between catalyst and carrier, substantially no interaction occurs which is detrimental to the activity or selectivity of the catalyst composite.

The reaction of adamantyl halide with the material selected from the group consisting of substituted allyl halides and olefins can be carried out in either a batch or a continuous type operation. In a batch type operation the desired proportion of adamantyl halide and substituted allyl halide or olefin are introduced into a suitable reactor containing a Friedel-Crafts type catalyst as such or composited with a carrier. The resultant commingled materials are contacted until a substantial proportion of the reactants are converted to the desired adamantyl haloalkane or adamantyl dihaloalkane. After separation from the catalyst, the reaction mixture can be fractionated to separate the unconverted reactants. The recovered reactants can then be re-used in the process.

In a continuous operation, the reactants are directed through a reactor of suitable design containing a fixed bed of Friedel-Crafts type catalyst. In this type of treatment the operating conditions can be adjusted and can differ somewhat from those used in the batch process.

The reaction of the adamantyl halide with the material selected form the group consisting of substituted allyl halides and olefins is carried out in the presence of a substantially inert solvent which is in the liquid state at the conditions of temperature and pressure employed in the reaction. Suitable solvents are, for example, hydrocarbons such as hexane and pentane, etc. A particularly suitable and preferred solvent is carbon disulfide. The solvent chosen, of course, should be one which does not itself undergo undesirable reaction at the operating conditions employed.

It will be understood by those skilled in the art that the operating conditions, i.e., conditions of temperature and pressure employed in the reaction of the adamantyl halide with the olefin or substituted allyl halide depends upon several factors including the composition of the starting compound and the particular catalyst employed. The reaction can generally be carried out at a temperature of from less than about −70° C. to about 25° C., preferably from about −70° C. to about −25° C. The pressure is suitably maintained to keep the reactants substantially in a liquid phase.

In accordance with one embodiment of our invention, the adamantyl haloalkane produced by the reaction of the adamantyl halide with the olefin is subjected to dehydrohalogenation thereby producing the corresponding alkenyl adamantane. In order to accomplish the dehydrohalogenation, the adamantyl haloalkane is treated in a manner to cause removal of a halogen and a hydrogen atom from adjacent carbon atoms. The net result is the formation of a double bond and the production of a molecule of halogen acid.

The dehydrohalogenation reaction can be thermally initiated, thus, heating at elevated temperatures is sufficient to split off the hydrogen halide from the adamantyl haloalkane. For convenience, however, in order to cause the reaction to proceed at lower temperatures with shorter reaction times and for greater freedom from undesirable side reactions, catalysts are employed in the dehydrohalogenation. The catalyst promotes the reaction to the extent that it is carried out more completely, in a shorter length of time, and at lower temperatures.

Any substance which is capable of activating halogen in organic compounds is suitable for use as a catalyst. Such substances are for example salts of aluminum, the alkali metals, e.g., sodium, potassium, lithium; the alkaline earth metals, e.g., magnesium, calcium, barium, zinc, copper, nickel, manganese and iron. The halides are especially suitable, but the sulfates, nitrates and organic acid salts of benzoates, acetates, and naphthanates are also suitable. Other suitable catalysts are acidic dehydrohalogenation catalysts such as alumina, chromia-alumina, silica-alumina, silicic acid, silver stearate and silver palmitate. The dehydrohalogenation can also be accomplished in the presence of sodium hydroxide or potassium hydroxide dissolved in a suitable solvent such as for example water, alcohol, pyridine, diethylene glycol and the like. The catalysts can be used as such or they can be composited with other materials for example, refractories, clays, alloys and the like.

Since the use of certain catalysts in the dehydrohalogenation of high molecular weight adamantyl haloalkane starting materials leads to isomerization, polymerization and cyclization in addition to a shift in the double bond formed in the reaction, it is preferred to cause the reaction to proceed under mild reaction conditions. A particularly suitable and preferred method which lends itself to mild conditions of operation, thereby minimizing undesirable side reactions resides in the use of sodium hydroxide dissolved in diethylene glycol.

The dehydrohalogenation reaction is carried out in the presence of a solvent. Suitable solvents are, for example, alcohols such as methanol, ethanol, ethylene glycol and diethylene glycol.

The dehydrohalogenation reaction can be carried out in either the liquid or vapor phase, the liquid phase being preferred. The liquid phase reaction can be carried out, for example, in a distillation type assembly where the catalyst and the adamantyl haloalkane can be contacted and treated together in a distillation pot, at a temperature and pressure to distill out the newly formed alkenyl adamantane while retaining the unconverted adamantyl haloalkane. The reaction can be carried out either batchwise or continuously. Where the catalyst used is a solid, it can be conveniently removed from the distillation residue by such means as filtration, decantation or the like. The specific reaction temperature will depend upon the specific compound being dehydrohalogenated and the contact time with the catalyst. Temperatures in the range of from about 60° C. to about 350° C. are suitable, although temperatures in the range of from about 50° C. to about 150° C. are preferred. The pressure need only be sufficient to keep the reactants substantially in the liquid phase.

The vapor phase reaction, although not preferred because of the undesirable side reactions which occur at the high temperatures required, can be carried out, for example, by passing the volatilized adamantyl haloalkane through a bed of catalyst at a rate sufficient to provide the desired degree of conversion. As noted in the discussion directed to the liquid phase reaction, the specific reaction temperatures will depend upon the specific adamantyl haloalkane being dehydrohalogenated and the contact time with the catalyst. A temperature sufficient to volatilize the starting compound is suitable.

In accordance with another specific embodiment of our invention, the adamantyl haloalkane produced by the reaction of the adamantyl halide and alkenyl halide is subjected to dehalogenation thereby producing the corresponding alkenyl adamantane. By means of the dehalogenation the adamantyl haloalkane is treated in such a manner as to cause the halogen atoms to split off from adjacent carbon atoms thereby resulting in the formation of a double bond. The dehalogenation is carried out in the presence of a catalyst.

Any substance which is capable of splitting off the adjacent halogen atoms from the organic compound is suitable for use as the catalyst, such substances are for example, bivalent metals such as zinc and magnesium; sodium iodide in acetone, magnesium in ether, magnesium and iodine in ether; sodium amalgam; and reagents comprising formates selected from the group consisting of alkali metal formates and ammonium formate, an alcohol, a ketone and an iodide selected from the group consisting of alkali metal iodides and ammonium iodide.

The dehalogenation reaction can be accomplished in either the liquid phase or vapor phase in the same manner as previously set forth for the dehydrohalogenation reaction. The liquid phase reaction is particularly suitable and is preferred. Here also since the use of certain catalysts in the dehalogenation of the high molecular weight adamantyl haloalkane starting materials leads to isomerization, polymerization and cyclicization in addition to the formation of the double bond, it is preferred to cause the reaction to proceed under mild reaction conditions. A particularly suitable and preferred catalyst which lends itself to mild conditions of operation, thereby minimizing undesirable side reaction is zinc.

The dehalogenation reaction is carried out in the presence of a solvent. Suitable solvents are, for example, ether and alcohols such as methanol, ethanol, ethylene glycol and diethylene glycol.

The specific reaction temperatures are dependent upon the specific compound being dehalogenated and the contact time with the catalyst. The dehalogenation is preferably carried out under refluxing conditions. Temperatures in the range of from about 0° C. to about 100° C. are suitable, although temperatures in the range of from about 30° C. to about 80° C. are preferred. The pressure need only be sufficient to keep the reactants substantially in a liquid phase.

In order to more fully understand the method of our invention reference is made to the following examples:

EXAMPLE I

To a solution of 21.5 gms. (0.10 mole) of 1-bromoadamantane and 12.1 gms. (0.10 mole) of allyl bromide in carbon disulfide at −70° C. there was slowly added 1.0 gms. (0.0075 mole) of anhydrous aluminum chloride. Upon completion of the addition, the temperature was increased to −30° C. and maintained at this temperature for approximately 1 hour. The reaction mixture was poured into an ice-water solution and extracted with ether. The ether extracts were washed with water and dried over magnesium sulfate ($MgSO_4$). Removal of the solvent gave a yellow oil which was distilled to furnish 25.5 gms. (75 percent yield) of 1-(2,3-dibromopropyl)adamantane.

To a refluxing solution, at atmospheric pressure, of 7.8 gms. (0.12 mole) of zinc in 70 ml. of 95 percent ethanol there was slowly added 33.6 gms. (0.10 mole) of 1-(2,3-dibromopropyl)adamantane. The total reaction mixture was then refluxed at atmospheric pressure for 2½ hours. The mixture was cooled, poured into water and extracted with ether. The ether extracts were washed with water and dried over magnesium sulfate (MgSO₄). Removal of the solvent gave a colorless liquid which was distilled to furnish 15.7 gms. (89 percent yield) of 1-allyladamantane.

EXAMPLE II

The procedure of Example I was repeated. The total reaction mixture was refluxed, however, for 1 hour rather than 2½ hours. 1-allyladamantane in a yield of 75 percent was obtained.

EXAMPLE III

In a flask equipped with a dropping funnel, a condenser fitted with a calcium chloride tube, and a stirrer there is placed 8.3 gms. (0.34 mole) of magnesium turnings and 120 ml. of dry ether. Thereafter 9.2 gms. (0.04 mole) of iodide is added in small portions. The formation of magnesium iodide occurs readily with the liberation of considerable heat. When the mixture bocmes colorless, 67.2 gms. (0.2 mole) of 1-(2,3-dibromopropyl)adamantane, prepared as set forth in Example I, is added drop-wise. The mixture is then poured into cracked ice approximately 1 hour after the addition of the 1-(2,3-dibromopropyl) adamantane is completed and the ether layer is separated, dried over magnesium sulfate, and distilled to furnish 1-allyladamantane in a yield in excess of 30 percent.

EXAMPLE IV

To a solution of 0.1 mole of 1-bromo-3-octyladamantane and 0.1 mole of allyl bromide in carbon disulfide at −70° C. there is slowly added 0.0075 mole of anhydrous aluminum chloride. Upon completion of the addition, the temperature is increased to −30° C. and maintained at this temperature for approximately 1 hour. The reaction mixture is then poured into an ice-water solution and extracted with ether. The ether extracts are washed with water and dried over magnesium sulfate (MgSO₄). Removal of the solvent furnishes 1-(2,3-dibromopropyl)-3-octyladamantane in a yield in excess of 40 percent. The 1-(2,3-dibromopropyl)-3-octyladamantane is then dehalogenated in the manner as set forth in Example I. 1-allyl-3-octyladamantane in a yield in excess of 30 percent is obtained.

EXAMPLE V

To a solution of 0.10 mole of 1-bromo-3-ethyl-5-hexyl-7-methyladamantane and 0.10 mole of 3-bromo-1-octene in carbon disulfide at −70° C. there is slowly added 0.0075 mole of anhydrous aluminum chloride. Upon completion of the addition, the temperature is increased to −30° C. and maintained at this temperature for approximately 1 hour. The reaction mixture is poured into an ice-water solution and extracted with ether. The ether extracts are washed with water and dried over magnesium sulfate (MgSO₄). Removal of the solvent results in the recovery of an oil which is distilled to furnish 1 - (2,3 - dibromooctyl) - 3 - ethyl - 5 - hexyl - 7 - methyladamantane in a yield in excess of 40 percent.

In a flask equipped with a dropping funnel, a condenser fitted with a calcium chloride tube and a stirrer there is placed 0.34 mole of magnesium turnings and 120 ml. of dry ether. Thereafter 0.04 mole of iodide is added in small portions. The formation of magnesium iodide occurs readily with the liberation of considerable heat. When the mixture becomes colorless 0.2 mole of 1 - (2,3 - dibromooctyl) - 3 - ethyl - 5 - hexyl - 7 - methyladamantane is added dropwise. The mixture is then poured into cracked ice approximately 1 hour after the addition is completed and the ether layer is separated, dried over magnesium sulfate and distilled to furnish 1 - (2 - octenyl)-3 - ethyl - 5 - hexyl - 7 - methyladamantane in a yield in excess of 30 percent.

EXAMPLE VI

To a solution of 21.5 gms. (0.01 mole) of 1-bromoadamantane, 4.48 gms. (0.106 mole) of propylene and 50 ml. of carbon disulfide at −70° C. there was slowly added 1.0 gm. (0.0075 mole) of aluminum chloride. When the addition was completed, the temperature was increased to −55° C., and maintained for 1 hour. The reaction mixture was then poured into an ice-water solution, extracted with ether and dried over magnesium sulfate. Removal of the solvent gave 7.5 gms. (98.5 percent yield) of a crude product comprising 1-(2-bromopropyl)adamantane.

A mixture of 25.7 gms. (0.10 mole) of the crude 1-(2-bromopropyl)adamantane, 32.2 gms. (0.807 mole) of sodium hydroxide, and 160 ml. of diethylene glycol was refluxed at atmospheric pressure for 12 hours and then cooled. 300 ml. of water was then added. The material was extracted with petroleum ether. The ether extracts were washed with water and dried over magnesium sulfate. Removal of the solvent gave a crude product which was distilled to furnish 1.3 gms. (7.4 percent yield) of 1-allyladamantane and 14 gms. (80 percent yield) of 1-propenyladamantane.

EXAMPLE VII

To a solution of 6.4 gms. (0.03 mole) of 1-bromoadamantane, 1.3 gms. (0.031 mole) of propylene and 15 ml. of carbon disulfide at −70° C. there was slowly added 0.3 gm. of aluminum chloride. When the addition was completed, the temperature was raised to −55° C. and maintained at that temperature for 1 hour. The reaction mixture was thereafter poured into an ice-water solution, extracted with ether and dried over magnesium sulfate. Distillation furnished 6.8 gms. of a crude product comprising 1-(2-bromopropyl)adamantane in a yield of 90 percent.

A mixture of 2.6 gms. (0.01 mole) of 1-(2-bromopropyl)adamantane, 3.0 gms. (0.075 mole) of sodium hydroxide and 15 ml. of diethylene glycol was then refluxed at atmospheric pressure for 12 hours, cooled, and 30 ml. of water was then added. The material was then extracted with petroleum ether. The ether extracts were washed with water and dried over magnesium sulfate. Distillation furnished a 15 percent yield of 1-allyladamantane and an 80 percent yield of 1-propenyladamantane.

EXAMPLE VIII 1-(2-bromopropyl)adamantane was prepared in the manner as set forth in Example VI. Thereafter a solution of 2.6 gms. (0.01 mole) of the 1-(2-bromopropyl) adamantane and 20 ml. of pyridine was refluxed at atmospheric pressure for 7 hours. The reaction mixture was cooled, added to 100 ml. of water and extracted with ether. The ether extracts were washed with dilute hydrochloric acid, water and dried over magnesium sulfate. Removal of the solvent furnished 0.18 gm. (11 percent yield of 1-allyladamantane and 1-propenyladamantane in a yield in excess of 40 percent.

EXAMPLE IX

To a solution of 0.10 mole of 1-bromo-3-ethyl-5-hexyl-7-methyladamantane in excess 1-octene at −70° C. there is slowly added 0.0075 mole of anhydrous aluminum chloride. Upon completion of the addition, the temperature is increased to −30° C. and maintained at this temperature for approximately 1 hour. The reaction mixture is poured into an ice-water solution and extracted with ether. The ether extracts are washed with water and dried over magnesium sulfate (MgSO₄). Removal of the solvent results in the recovery of an oil which is distilled to furnish 1-(2-bromooctyl)-3-ethyl-5-hexyl-7-methyl adamantane in a yield in excess of 5 percent.

A mixture of 0.10 mole of the crude 1-(2-bromooctyl)-3-ethyl-5-hexyl-7-methyladamantane, 0.807 mole of sodium hydroxide, and 160 ml. of diethylene glycol is refluxed at atmospheric pressure for 12 hours and then cooled. 300 ml. of water is then added. The material is extracted with petroleum ether. The ether extracts are washed with water and dried over magnesium sulfate. Removal of the solvent gives a crude product which is distilled to furnish 1-(2-octenyl)-3-ethyl-5-hexyl-7-methyl-adamantane in a yield in excess of 5 percent.

EXAMPLE X

A mixture of 0.10 mole of alpha-methyl-1-adamantane-methanol and 0.64 mole of bromine is heated at 100° C. for 2 hours in a sealed tube. The excess bromine is destroyed and the product is extracted with carbon tetrachloride. The solvent is removed and the crude product, i.e. alpha-methyl-3-bromo-1-adamantanemethanol is purified by recrystallization.

To a solution of 0.10 mole of alpha-methyl-3-bromo-1-adamantanemethanol and 0.10 mole of allyl bromide in carbon disulfide at —70° C. there is slowly added 0.0075 mole of anhydrous aluminum chloride. Upon completion of the addition, the temperature is increased to —30° C. and maintained at this temperature for approximately 1 hour. The reaction mixture is poured into an ice-water solution and extracted with ether. The ether extracts are washed with water and dried over magnesium sulfate ($MgSO_4$). Removal of the solvent gives an oil which is distilled to furnish aplha-methyl-3-(2,3-dibromopropyl)-1-adamantanemethanol.

A mixture of 0.10 mole of alpha-methyl-3-(2,3-dibromopropyl)-1-adamantanemethanol and 0.10 mole of boric acid is slowly heated to 160° C. and held at this temperature for 2 hours. The temperature is thence slowly increased to 220° C. and maintained at 220° C. for three hours. The total reaction time is 7 hours. A liquid is obtained which solidifies on cooling. The solid material is placed in ether and the inorganic material which does not go into solution is removed by filtration. The ether is removed by evaporation and the resulting liquid is distilled to furnish 3-(2,3-dibromopropyl)-1-vinyladamantane.

To a refluxing solution, at atmospheric pressure, 0.12 mole of zinc in 70 ml. of 95 percent ethanol there is slowly added 0.10 mole of 3-(2,3-dibromopropyl)-1-vinyladamantane. The total reaction mixture is then refluxed at atmospheric pressure for 2½ hours. The mixture is cooled, poured into water and extracted with ether. The ether extracts are washed with water and dried over magnesium sulfate ($MgSO_4$). Removal of the solvent gives a liquid which is distilled to furnish 3-allyl-1-vinyladamantane in a yield in excess of 20 percent.

EXAMPLE XI

A mixture of 0.10 mole of adamantane and 1.26 moles of bromine is heated at 100° C. for 2 hours in a sealed tube. The excess bromine is destroyed and the product is extracted with carbon tetrachloride. The solvent is removed and the crude product, i.e. 1,3-dibromoadamantane is purified by recrystallization.

To a solution of 0.10 mole of 1,3-dibromoadamantane and 0.10 mole of allyl bromide in carbon disulfide at —70° C. there is slowly added 0.0075 mole of anhydrous aluminum chloride. Upon completion of the addition, the temperature is increased to —30° C. and maintained at this temperature for approximately 1 hour. The reaction mixture is poured into an ice-water solution and extracted with ether. The ether extracts are washed with water and dried over magnesium sulfate ($MgSO_4$). Removal of the solvent gives a yellow oil which is distilled to furnish 1,3-bis(2,3-dibromopropyl)adamantane.

To a refluxing solution, at atmospheric pressure, 0.12 mole of zinc in 70 ml. of 95 percent ethanol there is slowly added 0.10 mole of 1,3-bis(2,3-dibromopropyl)-adamantane. The total reaction mixture is then refluxed at atmospheric pressure for 2½ hours. The mixture is cooled, poured into water and extracted with ether. The ether extracts are washed with water and dried over magnesium sulfate ($MgSO_4$). Removal of the solvent gives a liquid which is distilled to furnish 1,3-diallyladamantane in a yield in excess of 20 percent.

EXAMPLE XII

The following were charged to a dry Pyrex glass polymeriaztion tube under a nitrogen atmosphere: 15 ml. of dry n-heptane, 0.25 g. (1.2 mmoles) of redistilled thiisobutylaluminum and 0.26 g. (1.4 mmoles) of redistilled titanium tetrachloride. The resulting dark disperson was aged at 26° C. for one hour after which 2 g. of 1-allyladamantane was added. The tube was evacuated, sealed and agitated at 80° C. in an oil bath for 40 hours. Poly-(1-llyladamantane) was isolated as a colorless solid (12.5 percent yield) by precipitation from excess ethanol containing approximately 5 percent hydrochloric acid followed by washing with methanol and drying at 40° C. under vacuum.

EXAMPLE XIII

The polymerization initiator is prepared by reacting 1.2 mmoles of redistilled triisobutylaluminum and 0.5 mmole of redistilled titanium tetrachloride in 15 ml. of dry n-heptane under a nitrogen atmosphere. The resulting dark dispersion is aged at 26° C. for one hour after which an equimolar mixture of 1-allyladamantane, 1.8 g. and carried out under sealed tube conditions for 40 hours vinylcyclohexane, 1.1 g., is added. Polymerization is at 80° C. The copolymer mixture is isolated by precipitation from excess ethanol containing approximately 5 percent hydrochloric acid. The yield of copolymer is in excess of 10 percent.

The method of preparation of the alkenyl adamantanes is shown in Examples I through XI. Where bridgehead substituted adamantyl halides having from 1 to 3 alkyl substituents are substituted for bridgehead substituted adamatyl halides having no alkyl substituents substantially similar results are obtained. Examples IV, V and IX specifically show the conversion of bridgehead-substituted adamantyl halides having alkyl substituents to the corresponding alkenyl adamantanes. Examples XII and XIII show the method of preparation of polymers, i.e. homopolymers and copolymers of alkenyl adamantanes.

In each of the examples hereinabove set forth analysis of the products of the reactions is obtained through means of nuclear magnetic resonance, infrared and elemental analysis. The analysis of the monomers confirms the presence of the alkenyl group at bridgehead positions of the adamantane nucleus. The analysis of the polymers confirms the expected structure.

The alkenyl adamantanes prepared in accordance with our invention can be used, if desired, as starting materials for the preparation of alkyl adamantanes, for example, the alkenyl adamantane can be contacted with a hydrogen-containing gas in the presence of a hydrogenation catalyst such as, for example, a porous base such as alumina, silica alumina or charcoal impregnated with an active hydrogenation component such as palladium, nickel, platinum, cobalt and molybdenum, and particularly, the salts, oxides and sulfides of the afore-mentioned metals. A particularly suitable and preferred catalyst is charcoal impregnated with palladium. Wide ranges of temperature and pressure conditions can be employed in conducting the hydrogenation reaction, with the particular conditions being selected dependent upon the starting compound and the degree of hydrogenation desired. Suitable ranges of temperature and pressure are from about 100° C. to about 400° C. and from about atmospheric pressure to about 300 atmospheres respectively.

Example XIV is illustrative of a suitable method for the hydrogenation of an alkenyl adamantane.

EXAMPLE XIV 1-allyladamantane prepared in the manner as set forth in Example I is contacted in the liquid phase with hydrogen in the presence of a palladium on charcoal catalyst. The temperature is maintained at approximately 200° C., and the pressure is maintained at approximately 30 atmospheres. After removal of the catalyst by filtration, distillation results in the recovery of 1-propyladamantane in a yield in excess of 60 percent.

We claim:

1. A process for producing alkenyl adamantanes comprising contacting an adamantyl halide selected from the group consisting of adamantyl bromide and adamantyl chloride, and a Friedel-Crafts type catalyst with a material selected from the group consisting of substituted allyl halides selected from the groups consisting of allyl bromides and allyl chlorides, and olefins, thereby producing a material selected from the group consisting of adamantyl dihaloalkanes and adamantyl haloalkanes respectively and thereafter subjecting said adamantyl dihaloalkane to dehalogenation and subjecting said adamantyl haloalkane to dehydrohalogenation.

2. The process according to claim 1 wherein said contacting takes place in a solvent.

3. The process according to claim 1 wherein said Friedel-Crafts type catalyst is selected from the group consisting of aluminum chloride, iron (III) chloride, tin (IV) chloride and zinc chloride.

4. The process according to claim 1 wherein said adamantyl halide is an adamantyl bromide and said substituted allyl halide is a substituted allyl bromide.

5. The process according to claim 1 wherein said contacting takes place at a temperature in the range of from less than about $-70°$ C. to about $25°$ C.

6. The process according to claim 1 wherein said dehalogenation is carried out in a solvent.

7. The process according to claim 1 wherein said dehydrohalogenation is carried out in a solvent.

8. A process for producing alkenyl adamantanes comprising contacting an adamantyl bromide, a solvent and a Friedel-Crafts type catalyst selected from the group consisting of aluminum chloride, iron (III) chloride, tin (IV) chloride and zinc chloride at a temperature in the range of from less than about $-70°$ C. to about $25°$ C. with a material selected from the group consisting of substituted allyl bromides and olefins, thereby producing a material selected from the group consisting of adamantyl dibromoalkanes and adamantyl bromoalkanes respectively, and thereafter subjecting said adamantyl dibromoalkane to dehalogenation in a solvent and subjecting said adamantyl bromoalkane to dehydrohalogenation in a solvent.

9. The process according to claim 1 wherein said alkenyl adamantane is contacted with a hydrogen-containing gas in the presence of a hydrogenation catalyst thereby converting said alkenyl adamantane to an alkyl adamantane.

10. The process according to claim 8 wherein said alkenyl adamantane is contacted with a hydrogen-containing gas in the presence of a hydrogenation catalyst thereby converting said alkenyl adamantane to an alkyl admantane.

References Cited

UNITED STATES PATENTS

| | | | |
|---|---|---|---|
| 3,255,268 | 6/1966 | Suld | 260—666 |
| 3,275,700 | 9/1966 | Janoski | 260—666 |

OTHER REFERENCES

C. A. Grob et al.: Helv. Chim. Acta, vol. 47, pp. 1388, 1395–6, 1964.

H. Stetter, Ang. Chem., vol. 74, No. 11, pp. 361–374, 1962.

DELBERT E. GANTZ, Primary Examiner

V. O'KEEFE, Assistant Examiner